(12) United States Patent
Zhao et al.

(10) Patent No.: US 11,637,375 B2
(45) Date of Patent: Apr. 25, 2023

(54) ANTENNA STRUCTURE AND ELECTRONIC DEVICE

(71) Applicant: BEIJING XIAOMI MOBILE SOFTWARE CO., LTD., Beijing (CN)

(72) Inventors: Yarui Zhao, Beijing (CN); Mingming Zhou, Beijing (CN); Yuchuan Su, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 17/204,043

(22) Filed: Mar. 17, 2021

(65) Prior Publication Data
US 2022/0037790 A1 Feb. 3, 2022

(30) Foreign Application Priority Data
Jul. 29, 2020 (CN) .......................... 202010746041.0

(51) Int. Cl.
*H01Q 1/22* (2006.01)
*H01Q 9/04* (2006.01)

(52) U.S. Cl.
CPC ......... *H01Q 9/0414* (2013.01); *H01Q 1/2291* (2013.01); *H01Q 9/0464* (2013.01)

(58) Field of Classification Search
CPC .. H01Q 9/0414; H01Q 1/2291; H01Q 9/0464; H01Q 5/25; H01Q 5/371; H01Q 5/40; H01Q 9/04; H01Q 1/243; H01Q 1/36; H01Q 1/48
See application file for complete search history.

(56) References Cited

U.S. PATENT DOCUMENTS

| | | | | |
|---|---|---|---|---|
| 2012/0313834 A1* | 12/2012 | Eom | ................. | H01Q 7/00 343/700 MS |
| 2019/0214707 A1* | 7/2019 | Kim | ................. | H01Q 1/243 |
| 2021/0066787 A1* | 3/2021 | Wang | ................. | H01Q 9/0464 |
| 2022/0102838 A1* | 3/2022 | Bolz | ................. | H01Q 9/285 |

FOREIGN PATENT DOCUMENTS

CN    101662069 A    3/2010

OTHER PUBLICATIONS

European Patent Application No. 21165890.1 extended Search and Opinion dated Sep. 1, 2021, 8 pages.

* cited by examiner

*Primary Examiner* — Hai V Tran
*Assistant Examiner* — Michael M Bouizza
(74) *Attorney, Agent, or Firm* — Cozen O'Connor

(57) ABSTRACT

An antenna structure includes: a branching radiator, including a plurality of first radiation modes; a ring-shaped radiator surrounding the branching radiator, and including a plurality of second radiation modes; a feeding point and a grounding point, one of which is connected to the ring-shaped radiator, and the other is connected to the branching radiator; an antenna gap, which is provided between the branching radiator and the ring-shaped radiator. The ring-shaped radiator and the branching radiator are coupled through the antenna gap to form coupled radiation modes. A coupling among the first radiation modes, the second radiation modes and the coupled radiation modes broaden a radiation bandwidth of the antenna structure. The antenna structure may be incorporated in an electronic device.

16 Claims, 3 Drawing Sheets

ANTENNA STRUCTURE AND ELECTRONIC DEVICE

CROSS-REFERENCE TO RELATED APPLICATION

This application is based upon and claims priority to Chinese Patent Application Serial No. 202010746041.0, filed on Jul. 29, 2020, the entire contents of which are incorporated herein by reference.

TECHNICAL FIELD

The present disclosure relates to the field of network terminal technologies, and in particular to an antenna structure and an electronic device incorporating the antenna structure.

BACKGROUND

With the development of communication technology, the wider channel bandwidth based on Wifi 6E can greatly improve the experience of the present wireless network. Therefore, in order to configure an antenna that covers the working frequency band of Wifi 6E within an electronic device, an antenna with broadband needs to be provided within the electronic device. Due to the limited internal space of the electronic device, the method of widening the resonance bandwidth by continuously increasing parasitic branches will increase the difficulty of layout and assembly of other components.

SUMMARY

The present disclosure provides an antenna structure and an electronic device to solve the deficiencies in related technologies.

According to a first aspect of embodiments of the present disclosure, there is provided an antenna structure, including:

a branching radiator including a plurality of first radiation modes;

a ring-shaped radiator surrounding the branching radiator, and including a plurality of second radiation modes;

a feeding point and a grounding point, one of which is connected to the ring-shaped radiator, and the other is connected to the branching radiator;

an antenna gap, which is provided between the branching radiator and the ring-shaped radiator, wherein the ring-shaped radiator and the branching radiator are coupled through the antenna gap to form coupled radiation modes, and wherein a coupling among the first radiation modes, the second radiation modes and the coupled radiation modes broaden a radiation bandwidth of the antenna structure.

According to a second aspect of embodiments of the present disclosure, there is provided an electronic device, including an antenna structure as described in any of the above embodiments.

It should be understood that the above general description and the following detailed description are only exemplary and explanatory, and do not limit the present disclosure.

BRIEF DESCRIPTION OF THE DRAWINGS

The accompanying drawings herein, which are incorporated in and constitute a part of this specification, illustrate embodiments consistent with the present disclosure and, together with the description, serve to explain the principles of the present disclosure.

DETAILED DESCRIPTION

The exemplary embodiments will be described in detail here, and examples thereof are shown in the accompanying drawings. When the following description relates to the accompanying drawings, unless otherwise indicated, the same number in different figures represents the same or similar elements. The implementation manners described in the following exemplary embodiments do not represent all implementation manners consistent with the present disclosure. Rather, they are only examples of devices and methods consistent with some aspects of the present disclosure as detailed in the appended claims.

The terms used in the present disclosure are only for the purpose of describing specific embodiments, and are not intended to limit the present disclosure. The singular forms "a", "said" and "the" used in the present disclosure and appended claims are also intended to include plural forms, unless the context clearly indicates other meanings. It should also be understood that the term "and/or" used herein refers to and includes any or all possible combinations of one or more associated listed items.

It should be understood that although the terms first, second, third, etc. may be used in the present disclosure to describe various information, these items of information should not be limited to these terms. These terms are only used to distinguish the same type of information from each other. For example, without departing from the scope of the present disclosure, the first information may also be referred to as second information, and similarly, the second information may also be referred to as first information. Depending on the context, the word "if" as used herein can be interpreted as "upon" or "when" or "in response to determination".

Figure 1:
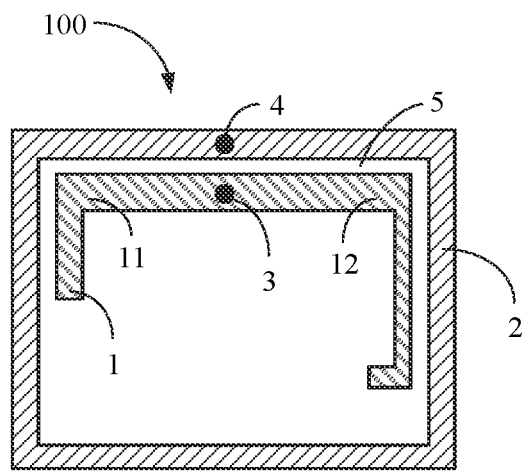
FIG. 1 is a schematic structural diagram showing an antenna structure shown according to an exemplary embodiment.
Figure 2:
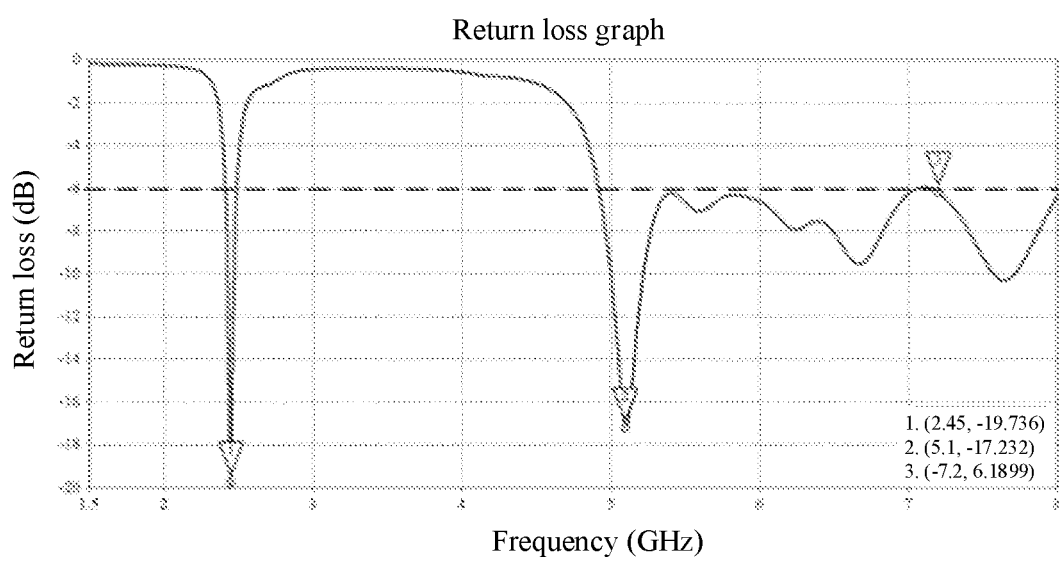
FIG. 2 is a graph of the return loss of the antenna structure in FIG. 1.

FIG. 1 is a schematic structural diagram of an antenna structure 100 shown according to an exemplary embodiment. As shown in FIG. 1, the antenna structure 100 may include a branching radiator 1, a ring-shaped radiator 2, a grounding point 3, and a feeding point 4. The feeding point 4 is connected to the branching radiator 1, and the grounding point 3 may be connected to the ring-shaped radiator 2. Of course, in other embodiments, it is also possible that the feeding point 4 is connected to the ring-shaped radiator 2, and the grounding point 3 is connected to the branching radiator 1. The branching radiator 1 may include a plurality of first radiation modes, and the resonance frequencies of the plurality of first radiation modes are not equal. In other words, the branching radiator 1 may be used to generate a plurality of resonances in different frequency bands. The ring-shaped radiator 2 may be arranged around the branching radiator 1, so that an antenna gap 5 is formed between the branching radiator 1 and the ring-shaped radiator 2. The ring-shaped radiator 2 may include a plurality of second radiation modes, and the resonance frequencies of the plurality of second radiation modes is not equal. That is, the ring-shaped radiator 2 can generate a plurality of resonant frequencies in different frequency bands. Moreover, through the antenna gap 5, the branching radiator 1 can couple with the ring-shaped radiator 2 to form coupled radiation modes by coupling. The coupling can be performed one another among the first radiation modes, the second radiation modes and the coupled radiation modes when the resonant frequencies are the same or close, thereby broadening the bandwidth of the antenna structure 100. For example, as shown in FIG. 2, which shows the graph of the return loss of the antenna 100, the ordinate of the graph is the return loss, the abscissa is the antenna frequency, the coordinates of the coordinate point 2 are (5.1, −17.232), and the coordinates of the coordinate point 3 are (−7.2, 6.1899). It can be seen that the frequency of the coverage area with the return loss less than −6 dB is 4.9 GHz to 8 GHz, which covers the frequency band of Wifi 6E (5.1 GHz-7.2 GHz). Moreover, the antenna structure 100 can support Wifi 6E communication.

It can be known from the above-described embodiments that the present disclosure utilizes the plurality of first radiation modes of the ring-shaped radiator 2, the plurality of second radiation modes of the branching radiator 1, and the coupling among the plurality of coupled radiation modes after the ring-shaped radiator 2 and the branching radiator 2 are coupled, which broadens the bandwidth of the antenna structure 100, so that the antenna structure 100 can cover the bandwidth of Wifi 6E, thereby realizing the Wifi 6E communication with the configuration of the antenna structure. Compared with the solution in the related technology, in which the single-mode radiation branch uses parasitic branches to increase the number of resonances and broaden the bandwidth, the technical solution of the present disclosure does not need to add parasitic branches, which is beneficial to the miniaturization of the antenna structure 100 and is beneficial to configure the arrangement of internal elements of electronic devices of the antenna structure 100.

In this embodiment, after the feeding point 4 is connected to the branching radiator 1, the branching radiator 1 may include a first radiation branch 11 located on one side of the feeding point 4 and a second radiation branch 12 located on the other side of the feeding point 4. The lengths of the first radiation branch 11 and the second radiation branch 12 are different, so that different resonances can be generated. That is, the first radiation branch 11 and the second radiation branch 12 can generate first radiation modes with different resonance frequencies, and through the branching radiator 1 as a whole, other resonant frequencies different from those of the first radiation branch 11 and the second radiation branch 12 can be generated. With this branching radiator 1, a plurality of first radiation modes with different frequencies can be generated, which is beneficial for the subsequent coupling between different radiation modes, and is beneficial to broaden the bandwidth of the antenna structure 100.

Figure 3:
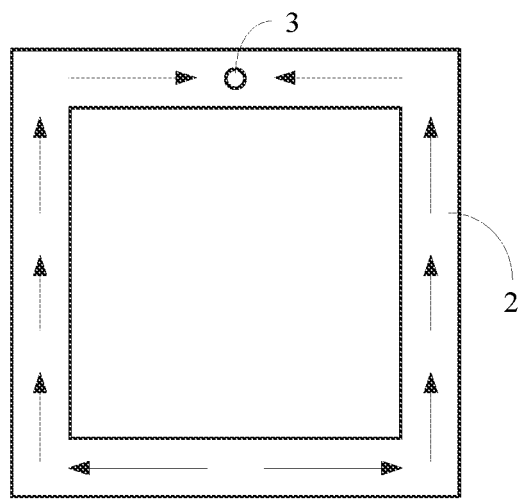
FIG. 3 is an electric current distribution diagram of a ring-shaped radiator in a radiation mode shown according to an exemplary embodiment.

The ring-shaped radiator 2 may be connected to the grounding point 3. For example, the ring-shaped radiator 2 may be connected to the grounding point 3 through an elastic sheet of metal. Compared with the technical solution of the branching radiator 1 being grounded, the antenna structure 100 can maintain better antenna performance in a complex electromagnetic environment when the ring-shaped radiator 2 is grounded. Moreover, through the introduction of the grounding point 3, a second radiation mode of 2×¼λ working mode shown in FIG. 3 can be introduced on the ring-shaped radiator 2, and the resonance of Wifi 2.4G can be generated through the second radiation mode. That is, as shown in FIG. 2, the antenna structure 100 can generate resonance at the coordinate point 1 (2.45, −19.736). The antenna structure 100 can cover the frequency band of Wifi 2.4G, and the electronic device configured with this antenna structure 100 can support Wifi 2.4G communication. The k is the free space wavelength corresponding to the center frequency of Wifi 2.4G.

Figure 4:
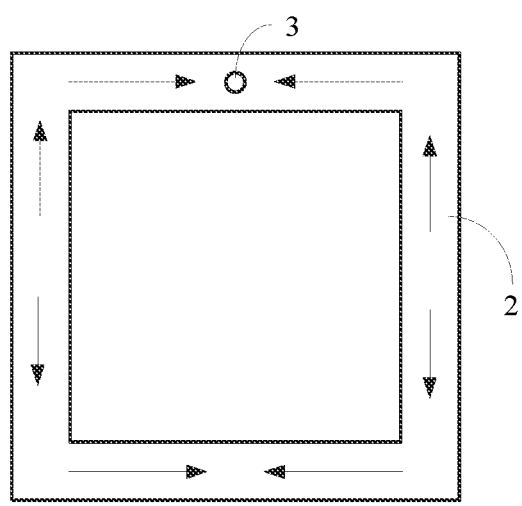
FIG. 4 is an electric current distribution diagram of a ring-shaped radiator in another radiation mode shown according to an exemplary embodiment.

The grounding point 3 can be provided at the intersection of the symmetric line of the ring-shaped radiator 2 and any side of the ring-shaped radiator 2. When the ring-shaped radiator 2 works in a 2×¼λ working mode to generate an antenna signal of Wifi 2.4G, the grounding point 3 is a point with a high electric current, as shown in FIG. 4. When the ring-shaped radiator 2 generates a first resonance of Wifi 6E in a 2×½λ working mode, the intersection is also a point with a high electric current. Therefore, the introduction of the grounding point 3 will not affect the first resonance in the frequency band of Wifi 6E, which reduces the correlation between Wifi 6E and Wifi 2.4G, and reduces the mutual influence.

Figure 5:
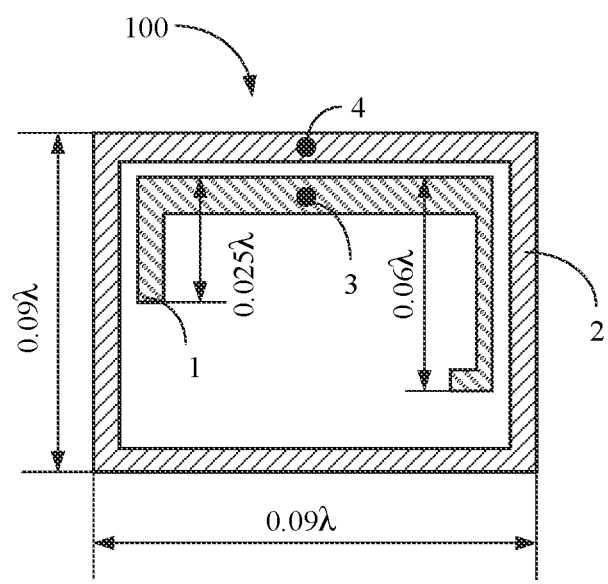
FIG. 5 is a schematic diagram of the size of an antenna structure shown according to an exemplary embodiment.
Figure 6:
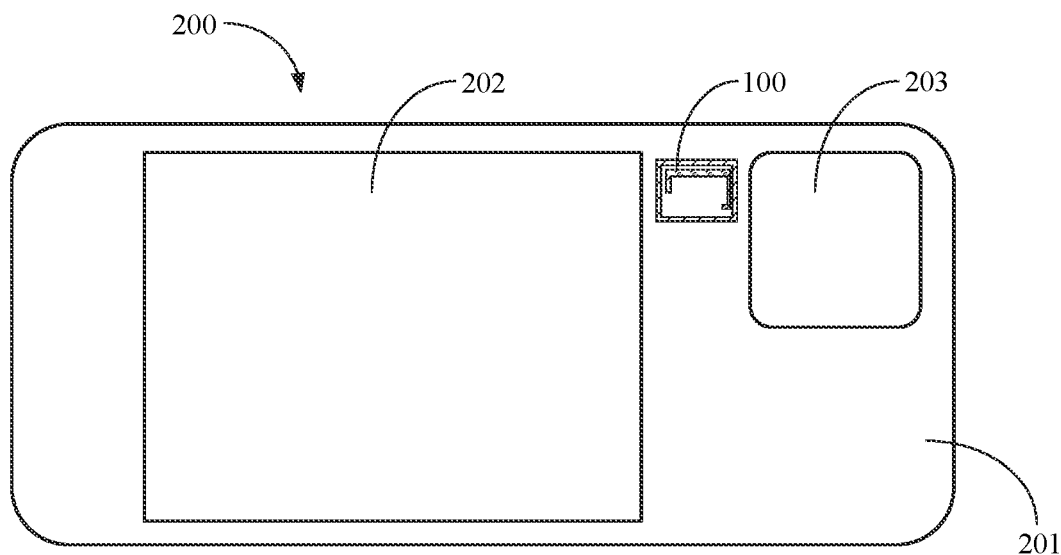
FIG. 6 is a partial schematic diagram of an electronic device shown according to an exemplary embodiment.

In each of the foregoing embodiments, the ring-shaped radiator 2 may include one of a rectangular radiator, a circular ring-shaped radiator, a triangular radiator, and a diamond-shaped radiator. In particular, when the ring-shaped radiator 2 is a rectangular radiator, as shown in FIG. 5, the length of each side of the rectangular radiator may be 0.09λ. Moreover, the branching radiator 1 may include a T-shaped radiation branch or an L-shaped radiation branch, etc. The T-shaped radiation branch can be connected to the feeding point 4, so that the T-shaped radiation branch may include asymmetric first radiation branch 11 and second radiation branch 12. The length of the first radiation branch 11 may be 0.06λ and the length of the second radiation branch 12 may be 0.025λ. The branching radiator 1 and the ring-shaped radiator 2 in the above described embodiment may be formed through a laser forming method, and the obtained antenna structure 100 is a laser formed antenna, which can avoid using the frame structure of an electronic device. As shown in FIG. 6, the present disclosure also provides an electronic device, and FIG. 6 is a partial schematic diagram of the electronic device 200. The electronic device may include a housing 201 and an antenna structure 100 described in any one of the above embodiments. The antenna structure 100 may be formed on the housing 201 between the battery compartment 202 and the rear camera 203 through laser. The antenna structure 100 is arranged between the battery compartment 202 and the rear camera 203, which enable the antenna structure 100 to be relatively closer to the middle area of the housing 201. When the user holds the electronic device, the probability of covering this area is small, so that the effect of the user's holding of the electronic device on the radiation of the antenna signal of the antenna structure 100 can be reduced. Alternatively, in other embodiments, it may also be arranged at another position on the housing 201, which is not specifically limited by the present disclosure.

After considering the specification and practicing the disclosure disclosed herein, those skilled in the art will easily think of other implementations of the present disclosure. The present disclosure is intended to cover any variations, uses, or adaptive changes of the present disclosure. These variations, uses, or adaptive changes follow the general principles of the present disclosure and include common knowledge or commonly used technical means in the technical field, which not disclosed in the present disclosure. The description and the embodiments are only regarded as exemplary, and the true scope and spirit of the present disclosure will be indicated by the following claims.

It should be understood that the present disclosure is not limited to the precise structure that has been described above and shown in the drawings, and various modifications and changes can be made without departing from its scope. The scope of the present disclosure is only limited by the appended claims.

What is claimed is:

1. An antenna structure, comprising:
a branching radiator comprising a plurality of first radiation modes;
a ring-shaped radiator surrounding the branching radiator, and comprising a plurality of second radiation modes;
a feeding point and a grounding point, one of which is connected to the ring-shaped radiator, and the other is connected to the branching radiator;
an antenna gap, which is provided between the branching radiator and the ring-shaped radiator, the ring-shaped radiator and the branching radiator being coupled through the antenna gap to form coupled radiation modes, a coupling among the first radiation modes, the second radiation modes and the coupled radiation modes broadening a radiation bandwidth of the antenna structure;
wherein the branching radiator is connected to the feeding point, and the branching radiator comprises a first radiation branch located at one side of the feeding point and a second radiation branch located at the other side of the feeding point, resonance frequencies generated by the first radiation branch and the second radiation branch being different;
the grounding point is connected to the ring-shaped radiator, and the first radiation mode comprises a radiation mode of two times a quarter wavelength, the radiation mode of two times a quarter wavelength generating a resonance in a frequency band of Wifi 2.4G, and the wavelength being a free space wavelength corresponding to a center frequency of Wifi 2.4G, and
the grounding point is provided at an intersection of a symmetric line of the ring-shaped radiator and any side of the ring-shaped radiator, the intersection being a point with a high electric current when the first radiation mode is a radiation mode of two times a quarter wavelength or a point with a high electric current when the second radiation mode is a radiation mode of two times a half wavelength, the feeding point is provided at the symmetric line of the ring-shaped radiator.

2. The antenna structure according to claim 1, wherein the antenna structure covers a frequency band of Wifi 6E.

3. The antenna structure according to claim 1, wherein the ring-shaped radiator comprises one of a rectangular radiator, a circular ring-shaped radiator, a diamond-shaped radiator, and a triangular radiator.

4. The antenna structure according to claim 1, wherein the ring-shaped radiator comprises a rectangular radiator, a length of each side of the rectangular radiator being 0.09 wavelengths, and the wavelength being a free space wavelength corresponding to a center frequency of Wifi 2.4G.

5. The antenna structure according to claim 1, wherein the branching radiator comprises a T-shaped radiation branch.

6. The antenna structure according to claim 5, wherein the T-shaped radiation branch comprises a first radiation branch and a second radiation branch, a length of the first radiation branch being 0.06 wavelengths, a length of the second radiation branch being 0.025 wavelengths, and the wavelength being a free space wavelength corresponding to a center frequency of Wifi 2.4G.

7. The antenna structure according to claim 1, wherein lengths of the first radiation branch and the second radiation branch are different.

8. The antenna structure according to claim 1, wherein the first radiation branch is a L-shaped radiation branch, and the second radiation branch is a T-shaped radiation branch.

9. An electronic device comprising an antenna structure, the antenna structure comprising:
a branching radiator comprising a plurality of first radiation modes;
a ring-shaped radiator surrounding the branching radiator, and comprising a plurality of second radiation modes;
a feeding point and a grounding point, one of which is connected to the ring-shaped radiator, and the other is connected to the branching radiator;
an antenna gap, which is provided between the branching radiator and the ring-shaped radiator, the ring-shaped radiator and the branching radiator being coupled through the antenna gap to form coupled radiation modes, a coupling among the first radiation modes, the second radiation modes and the coupled radiation modes broadening a radiation bandwidth of the antenna structure;
wherein the branching radiator is connected to the feeding point, and the branching radiator comprises a first radiation branch located at one side of the feeding point and a second radiation branch located at the other side of the feeding point, resonance frequencies generated by the first radiation branch and the second radiation branch being different;
the grounding point is connected to the ring-shaped radiator, and the first radiation mode comprises a radiation mode of two times a quarter wavelength, the radiation mode of two times a quarter wavelength generating a resonance in a frequency band of Wifi 2.4G, and the wavelength being a free space wavelength corresponding to a center frequency of Wifi 2.4G, and
the grounding point is provided at an intersection of a symmetric line of the ring-shaped radiator and any side of the ring-shaped radiator, the intersection being a point with a high electric current when the first radiation mode is a radiation mode of two times a quarter wavelength or a point with a high electric current when the second radiation mode is a radiation mode of two times a half wavelength, the feeding point is provided at the symmetric line of the ring-shaped radiator.

10. The electronic device according to claim 9, wherein the antenna structure covers a frequency band of Wifi 6E.

11. The electronic device according to claim 9, wherein the ring-shaped radiator comprises one of a rectangular radiator, a circular ring-shaped radiator, a diamond-shaped radiator, and a triangular radiator.

12. The electronic device according to claim 9, wherein the ring-shaped radiator comprises a rectangular radiator, a length of each side of the rectangular radiator being 0.09 wavelengths, and the wavelength being a free space wavelength corresponding to a center frequency of Wifi 2.4G.

13. The electronic device according to claim 9, wherein the branching radiator comprises a T-shaped radiation branch.

14. The electronic device according to claim 13, wherein the T-shaped radiation branch comprises a first radiation branch and a second radiation branch, a length of the first radiation branch being 0.06 wavelengths, a length of the second radiation branch being 0.025 wavelengths, and the wavelength being a free space wavelength corresponding to a center frequency of Wifi 2.4G.

15. The electronic device according to claim 9, further comprising:
   a housing, wherein the antenna structure is disposed inside the housing.

16. The electronic device according to claim 15, further comprising:
   a battery compartment and a rear camera both disposed inside the housing, wherein the antenna structure is disposed between the battery compartment and the rear camera.

\* \* \* \* \*